US009346611B1

(12) United States Patent
Roberts et al.

(10) Patent No.: US 9,346,611 B1
(45) Date of Patent: May 24, 2016

(54) APPARATUS AND PROCESSES FOR CREATING A CONSUMABLE LIQUID FOOD OR BEVERAGE PRODUCT FROM FROZEN CONTENTS

(71) Applicant: Meltz, LLC, Ipswich, MA (US)

(72) Inventors: Matthew Roberts, Ipswich, MA (US); Paul Kalenian, Santa Fe, NM (US); Douglas M. Hoon, Guilford, CT (US)

(73) Assignee: Meltz, LLC, Ipswich, MA (US)

( * ) Notice: Subject to any disclaimer, the term of this patent is extended or adjusted under 35 U.S.C. 154(b) by 0 days.

(21) Appl. No.: 14/801,540

(22) Filed: Jul. 16, 2015

Related U.S. Application Data

(60) Provisional application No. 62/136,072, filed on Mar. 20, 2015.

(51) Int. Cl.
*B65D 85/804* (2006.01)
*B65D 85/72* (2006.01)

(52) U.S. Cl.
CPC ............ *B65D 85/8043* (2013.01); *B65D 85/72* (2013.01)

(58) Field of Classification Search
CPC ...................... B65D 85/72; B65D 85/8043
See application file for complete search history.

(56) References Cited

U.S. PATENT DOCUMENTS

| | | | |
|---|---|---|---|
| 2,312,046 A | 2/1943 | Warren | |
| 2,332,553 A | 10/1943 | Benedict | |
| 3,235,390 A | 2/1966 | Vischer | |
| 3,412,572 A | 11/1968 | Kesling | |
| 3,589,272 A * | 6/1971 | Bouladon | B65D 85/8043 426/112 |
| 4,681,030 A | 7/1987 | Herbert | |
| 4,853,234 A * | 8/1989 | Bentley | B65D 85/8043 206/0.5 |
| 5,323,691 A | 6/1994 | Reese et al. | |
| 5,325,765 A | 7/1994 | Sylvan et al. | |
| 5,480,189 A | 1/1996 | Davies et al. | |
| 5,669,208 A | 9/1997 | Tabaroni et al. | |
| 5,770,003 A | 6/1998 | Tabaroni et al. | |
| D395,821 S | 7/1998 | Tabaroni et al. | |
| D397,292 S | 8/1998 | Tabaroni et al. | |
| 5,789,005 A | 8/1998 | Tabaroni et al. | |
| 5,997,936 A * | 12/1999 | Jimenez-Laguna | A23C 3/04 426/130 |
| 6,079,315 A | 6/2000 | Beaulieu et al. | |
| 6,082,247 A | 7/2000 | Beaulicu | |
| 6,142,063 A | 11/2000 | Beaulieu et al. | |
| 6,182,554 B1 | 2/2001 | Beaulieu et al. | |

(Continued)

FOREIGN PATENT DOCUMENTS

| | | | | |
|---|---|---|---|---|
| EP | 2 468 159 | * | 6/2012 | ............ A47J 43/046 |
| WO | WO-9309684 A1 | | 5/1993 | |
| WO | WO 2013/124811 | * | 8/2013 | ......... B65D 85/8043 |

*Primary Examiner* — Erik Kashnikow
*Assistant Examiner* — Chaim Smith
(74) *Attorney, Agent, or Firm* — Wilmer Cutler Pickering Hale and Dorr LLP

(57) ABSTRACT

Techniques are provided for creating a consumable liquid food or beverage product from frozen contents. A container is configured for insertion into an apparatus. The container includes a frozen content, a receptacle defining an opening and a cavity for receiving and storing the frozen content, and a closure formed over the opening of the receptacle for sealing the frozen content within the cavity of the receptacle. The receptacle is perforable, and the container is configured for insertion into an apparatus that is configured to create a consumable liquid beverage from the frozen content within the container, such that the frozen content is extracted through a perforation created in the receptacle by the apparatus.

27 Claims, 12 Drawing Sheets

(56) References Cited

U.S. PATENT DOCUMENTS

| | | |
|---|---|---|
| 6,440,256 B1 | 8/2002 | Gordon et al. |
| 6,444,160 B1 | 9/2002 | Bartoli |
| 6,589,577 B2 | 7/2003 | Lazaris et al. |
| 6,606,938 B2 | 8/2003 | Taylor |
| 6,607,762 B2 | 8/2003 | Lazaris et al. |
| 6,609,821 B2 | 8/2003 | Wulf et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,708,600 B2 | 3/2004 | Winkler et al. |
| 6,887,506 B2 | 5/2005 | Kalenian |
| 7,004,322 B1 | 2/2006 | Bartoli |
| 7,165,488 B2 | 1/2007 | Bragg et al. |
| 7,168,560 B2 | 1/2007 | Finetti et al. |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter et al. |
| 7,419,692 B1 | 9/2008 | Kalenian |
| 7,493,930 B2 | 2/2009 | Finetti et al. |
| 7,513,192 B2 | 4/2009 | Sullivan et al. |
| 7,523,695 B2 | 4/2009 | Streeter et al. |
| 7,640,845 B2 | 1/2010 | Woodnorth et al. |
| 7,875,304 B2 | 1/2011 | Kalenian |
| 7,959,851 B2 | 6/2011 | Finetti et al. |
| 8,151,694 B2 | 4/2012 | Jacobs et al. |
| 8,361,527 B2 | 1/2013 | Winkler et al. |
| 8,475,153 B2 | 7/2013 | Finetti et al. |
| 8,495,949 B2 | 7/2013 | Tinkler et al. |
| 8,516,948 B2 | 8/2013 | Zimmerman et al. |
| 8,563,058 B2 | 10/2013 | Roulin et al. |
| 8,573,114 B2 | 11/2013 | Huang et al. |
| 8,609,170 B2 | 12/2013 | Tinkler et al. |
| 8,663,080 B2 | 3/2014 | Bartoli et al. |
| 8,667,892 B2 | 3/2014 | Cominelli et al. |
| 8,722,124 B2 | 5/2014 | Ozanne |
| 8,800,431 B2 | 8/2014 | Sullivan et al. |
| 8,808,775 B2 | 8/2014 | Novak et al. |
| 8,834,948 B2 | 9/2014 | Estabrook et al. |
| 8,863,987 B2 | 10/2014 | Jacobs et al. |
| 8,877,276 B2 | 11/2014 | Cominelli et al. |
| 8,889,203 B2 | 11/2014 | York |
| 8,916,215 B2 | 12/2014 | Yoakim et al. |
| 8,920,858 B2 | 12/2014 | Yauk et al. |
| 8,956,672 B2 | 2/2015 | Yoakim et al. |
| 8,960,078 B2 | 2/2015 | Hristov et al. |
| 8,962,048 B2 | 2/2015 | Gerbaulet et al. |
| 8,973,341 B2 | 3/2015 | Bartoli et al. |
| 9,023,412 B2 | 5/2015 | Doleac et al. |
| 9,079,705 B2 | 7/2015 | Digiuni |
| 9,085,410 B2 | 7/2015 | Beer |
| 9,113,744 B2 | 8/2015 | Digiuni |
| 9,120,617 B2 | 9/2015 | Beer |
| 9,161,652 B2 | 10/2015 | Kamerbeek et al. |
| D742,679 S | 11/2015 | Bartoli et al. |
| 9,205,975 B2 | 12/2015 | Giovanni |
| 9,247,430 B2 | 1/2016 | Kountouris et al. |
| 2004/0045265 A1 | 3/2004 | Bartoli et al. |
| 2004/0075069 A1 | 4/2004 | Bartoli et al. |
| 2004/0077475 A1 | 4/2004 | Bartoli |
| 2004/0232595 A1 | 11/2004 | Bartoli |
| 2004/0247721 A1 | 12/2004 | Finetti et al. |
| 2004/0256766 A1 | 12/2004 | Finetti et al. |
| 2005/0017118 A1 | 1/2005 | Finetti et al. |
| 2005/0034580 A1 | 2/2005 | Finetti et al. |
| 2005/0034817 A1 | 2/2005 | Finetti et al. |
| 2005/0039849 A1 | 2/2005 | Finetti et al. |
| 2005/0130820 A1 | 6/2005 | Finetti et al. |
| 2005/0138902 A1 | 6/2005 | Bartoli et al. |
| 2008/0089983 A1* | 4/2008 | Coste .................. A23G 9/04 426/106 |
| 2010/0143565 A1 | 6/2010 | McGill |
| 2010/0209563 A1 | 8/2010 | Mark |
| 2011/0071009 A1 | 3/2011 | Bartoli et al. |
| 2011/0094195 A1 | 4/2011 | Bartoli et al. |
| 2011/0203740 A1 | 8/2011 | Finetti et al. |
| 2012/0267036 A1 | 10/2012 | Bartoli et al. |
| 2012/0308691 A1 | 12/2012 | Alvarez et al. |
| 2013/0043151 A1 | 2/2013 | Bartoli et al. |
| 2013/0193616 A1 | 8/2013 | Bartoli et al. |
| 2013/0327223 A1 | 12/2013 | Bartoli et al. |
| 2014/0026761 A1 | 1/2014 | Bartoli et al. |
| 2014/0106033 A1 | 4/2014 | Roberts |
| 2014/0137210 A1 | 5/2014 | Kountouris et al. |
| 2014/0342060 A1 | 11/2014 | Bartoli et al. |
| 2015/0001100 A1 | 1/2015 | Bartoli et al. |
| 2015/0068405 A1 | 3/2015 | Bartoli et al. |
| 2015/0072052 A1 | 3/2015 | Bartoli et al. |
| 2015/0108011 A1 | 4/2015 | Bartoli et al. |
| 2015/0128525 A1 | 5/2015 | Bartoli et al. |
| 2015/0140251 A1 | 5/2015 | Bartoli et al. |
| 2015/0151903 A1 | 6/2015 | Bartoli et al. |
| 2015/0210030 A1 | 7/2015 | Bartoli et al. |
| 2015/0217880 A1 | 8/2015 | Bartoli et al. |
| 2015/0217881 A1 | 8/2015 | Bartoli et al. |
| 2015/0232279 A1 | 8/2015 | Bartoli et al. |
| 2015/0329282 A1 | 11/2015 | Bartoli et al. |
| 2015/0344219 A1 | 12/2015 | Bartoli et al. |
| 2015/0367269 A1 | 12/2015 | Bartoli et al. |
| 2016/0001903 A1 | 1/2016 | Bartoli et al. |

* cited by examiner

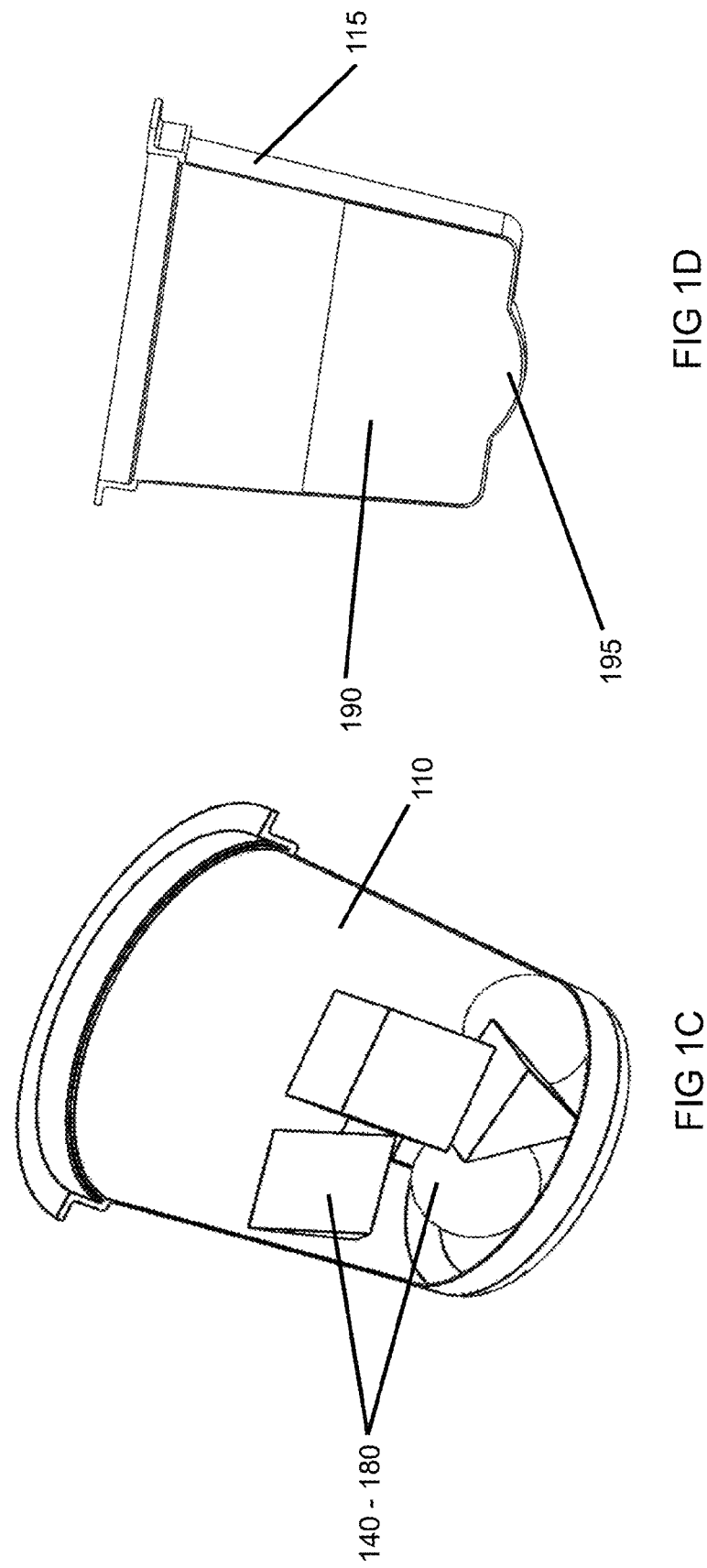

| A frozen beverage concentrate is enclosed in a perforable receptacle. 310 |  | The receptacle is perforated and accommodated by a machine-based system and liquefied via a melting component. 320 |  | The melted beverage liquid is dispensed via a machine-based system and diluted with an additional liquid dispensed via said system. 330 |  | A secondary container receives a beverage of preferable strength from the machine-based system. 340 |

FIG 3

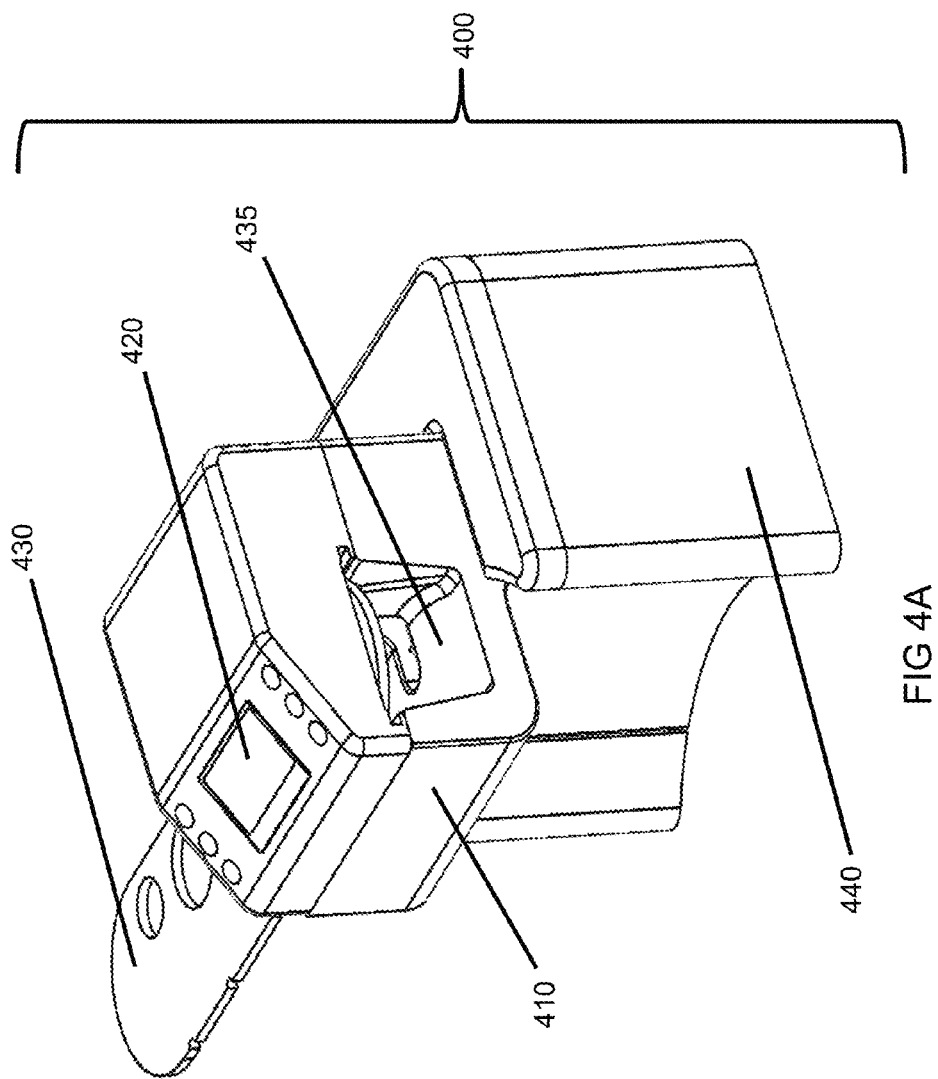

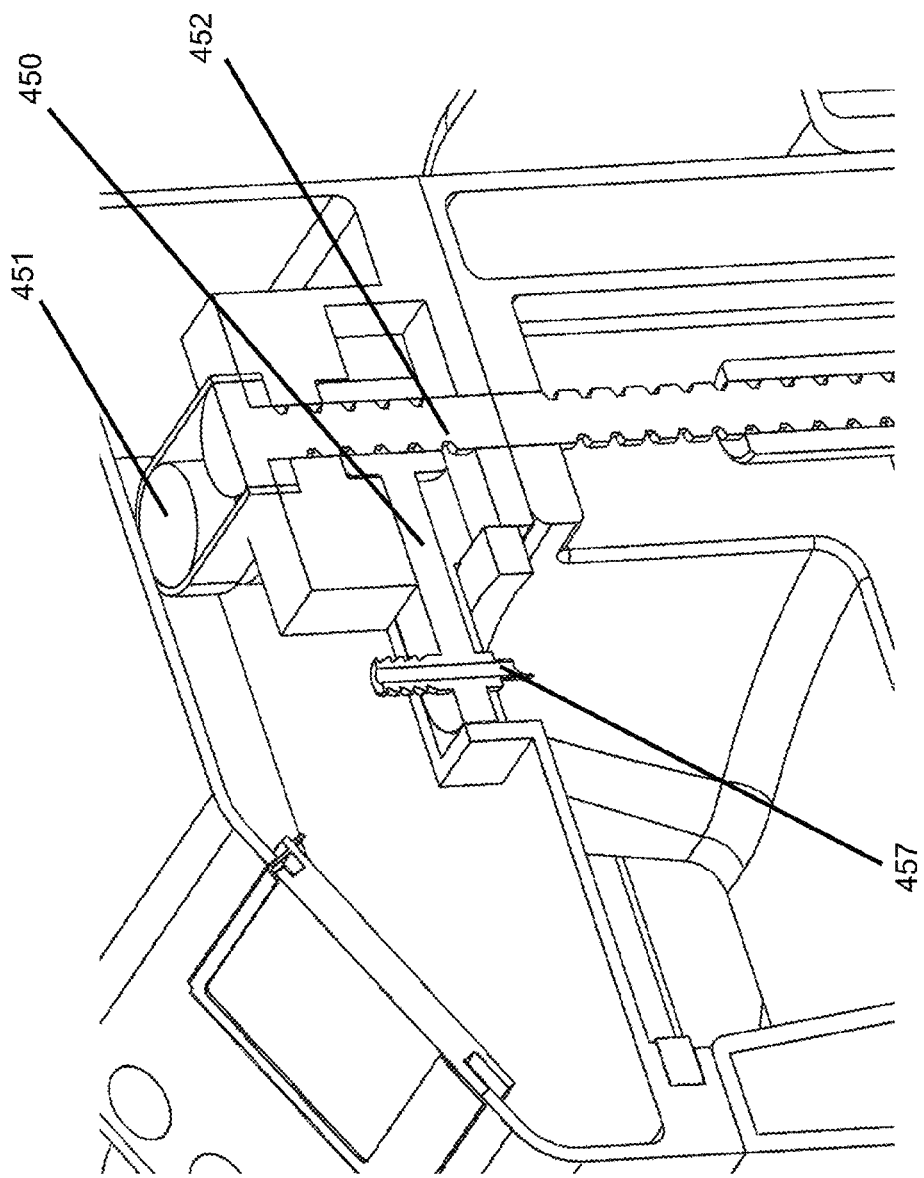

430

APPARATUS AND PROCESSES FOR CREATING A CONSUMABLE LIQUID FOOD OR BEVERAGE PRODUCT FROM FROZEN CONTENTS

RELATED APPLICATIONS

This application relates to and claims priority under 35 U.S.C. §119(e) to U.S. Provisional Patent Application No. 62/136,072, titled "PACKAGING AN ICED CONCENTRATE," which was filed on Mar. 20, 2015 and is hereby incorporated by reference herein in its entirety.

TECHNICAL FIELD

The technical field relates generally to an apparatus and processes for creating a consumable liquid food or beverage product from a frozen content, and in particular a frozen liquid that is packaged in a receptacle which is designed to be accommodated by a machine-based system to facilitate the melting and/or diluting of the frozen contents and creation of a ready-to-consume food or beverage therefrom. The frozen liquid can be derived from a food or beverage concentrate, extract, and/or other consumable fluid.

BACKGROUND

Current or prior machine-based coffee brewing systems and coffee packaging products allow consumers to produce purportedly fresh-brewed beverages at the touch of a button while eliminating the need for additional process steps such as measuring, handling of filters, and/or messy disposal of used grounds. These machine-based systems typically utilize a receptacle that contains dry solids or powders such as dry coffee grinds, tea leaves, or cocoa powder, as well as a filtration media to prevent migration of unwanted solids into the user's cup or glass, and some type of cover or lid. The receptacle itself is often thin-walled so it can be perforated with needles or other mechanisms so that a solvent (e.g., water) can be injected into the receptacle. In practice, the receptacle is inserted into the machine and, upon closing the machine's cover, the receptacle is pierced to produce an inlet and an outlet. Thereafter, the solvent is delivered to the inlet, added into the receptacle, and a brewed beverage exits via the outlet.

Such systems often suffer from problems with being able to maintain freshness of the contents in the receptacle, versatility from a finite sized package, and/or the inability to conveniently recycle the large number of receptacles created each year.

The issue of maintaining freshness can occur, for example, when the dry solid is a finely ground coffee. This issue is largely the result of unwanted oxidation of critical flavor and aroma compounds in the coffee grounds, a problem that can be exacerbated by the fact that ground coffee presents a very large surface area to its ambient environment. While some manufactures may attempt to address this problem using MAP (Modified Atmosphere Packaging) methods (e.g., the introduction of a non-oxidizing gas in place of ambient air), their efforts are often largely unsuccessful for a number of reasons. For example, freshly roasted whole bean or ground coffee profusely outgases $CO_2$, thus requiring a pre-packaging step to allow the grounds to "degas" prior to packaging so the receptacle does not swell or puff outwardly due to pressure created from within the receptacle, which in turn would cause the receptacle to take on the appearance of spoiled product. In addition, this $CO_2$ outgassing carries with it and depletes a rich mixture of fresh coffee aromas from the ground coffee. Further, coffee is 44% oxygen by composition, which may impact the flavor and fragrance of the coffee internally after the roasting process.

Another downfall of these receptacles that contain dry solids or powders is often their inability to create a wide range of beverage potency and serving sizes from a given packaging size. A pod that holds ten grams of ground coffee can only produce about two grams of actual brewed coffee compounds if brewed according to SCAA (Specialty Coffee Association of America) brewing guidelines. In turn, when two grams of brewed coffee compounds are diluted in a ten ounce cup of coffee, a concentration of about a 0.75 total dissolved solids (TDS) results. TDS is a measure of the combined content of inorganic and organic substances contained in a liquid in molecular, ionized or micro-granular colloidal solids suspended form. Therefore, such a cup of coffee is often considered a very weak cup of coffee for many consumers. Conversely, some brewers can over-extract the same ten grams of coffee grounds to create a higher TDS; however, the additional dissolved solids that are extracted are often harsh on the palate and can ruin the flavor integrity of the coffee.

Turning to the matter of recycling, the presence of leftover coffee grounds, tea leaves and/or other residual waste after brewing (e.g., spent filters left within the receptacles) typically makes receptacles unsuitable for recycling. Consumers could remove the cover from the spent receptacles and rinse out the residual material, but this is time consuming, messy, a waste of water, and/or a waste of valuable soil nutrients that could otherwise be recycled back into the farming ecosystem. Therefore, most consumers will not bother to recycle in return for such an insignificant apparent ecological gain. Recycling can also be impacted by the type of thermoplastic material used in some receptacles. For example, in an effort to minimize loss of freshness as discussed above, some manufacturers have chosen to use materials that have exceptional vapor barrier properties, for example, a laminated film material with an inner layer of EVOH plastic. The combination of different thermoplastic materials in such a laminated film, which could be some combination of EVOH, polypropylene, polyethylene, PVC and/or others material is unsuited to recycling.

Despite the disadvantages above, there still exist a number of different machine-based systems on the market today that create beverages from single-serving capsule products. These have become extremely popular with consumers, primarily for the convenience they offer in making an acceptable (not necessarily excellent) cup of coffee, often causing the consumer to swap café quality brewed coffee for the convenience of a single serving home-brewed cup.

In addition to single serving capsule products, there exist frozen products such as coffee extracts and juice concentrates that are currently packaged in large containers and cans (e.g., 2 liters) for creating multiple servings of beverages from a single container. However, it is usually inconvenient and time-consuming to prepare a beverage from these frozen extracts or concentrates. Some coffee products, for example, must be slowly melted prior to use, typically over a period of several hours or days. The end product is usually stored in a refrigerator thereafter to preserve its quality when less than all servings are consumed. Further, for beverages that are enjoyed hot, like coffee and tea, the melted extract must then be heated appropriately. Many of these products are not shelf stable, for example coffee that has a high percentage of solids in the grounds, as these solids are the result of hydrolyzed wood, which are subject to decomposition and spoilage. Accordingly, the flavor and quality in these large batch frozen products can deteriorate in a matter of hours even at refrigeration temperatures. In addition, the method of forming the final consumable beverage is often not automated and is therefore subject to over- or under-dilution, leading to an inconsistent user experience.

SUMMARY

The techniques described herein improve the overall quality and taste of coffees, teas, and other beverages conveniently available to consumers in their homes.

The disclosed subject matter includes a receptacle configured for insertion into an apparatus. The receptacle includes a frozen content. The receptacle includes an opening and a cavity for receiving and storing the frozen content, wherein the receptacle is perforable. The receptacle includes a closure formed over the opening of the receptacle for sealing the frozen content within the cavity of the receptacle, wherein the receptacle is configured for insertion into an apparatus that is configured to create a consumable liquid beverage from the frozen content within the receptacle, such that the frozen content is extracted through a perforation created in the receptacle by the apparatus.

In some examples, the receptacle includes a gas impermeable material configured to preserve freshness and aroma of the frozen content. The receptacle and the closure can each include a recyclable material such that the receptacle and the closure can be recycled once the consumable liquid beverage is created. The receptacle can include an edible material that may be dissolved and consumed. The frozen content can be selected from a group consisting of: a frozen coffee extract, a frozen tea extract, a frozen lemonade concentrate, a frozen vegetable concentrate, a frozen broth, a frozen liquid dairy product, a frozen alcohol product, a frozen syrup, and a frozen fruit concentrate, or any combination thereof.

In some examples, the receptacle is configured such that the receptacle can be perforated before the receptacle is inserted into the apparatus, can be perforated after the receptacle is inserted into the apparatus, or both. The receptacle can include headspace between the frozen content and the closure, wherein the headspace is configured to include an inert or reduced reactivity gas in place of atmospheric air in the receptacle. The receptacle can be filterless.

In some examples, the content and the receptacle are provided in a controlled portion arrangement. The controlled portion arrangement can include a single-serving sized format. The controlled portion arrangement can include a batch-serving sized format for producing multiple servings from a single or a plurality of injections of liquid.

In some examples, the container is configured to receive a heated liquid through the perforated receptacle to expedite liquefaction and dilution of the frozen content. The container can be configured to receive heat to expedite melting of the frozen contents within the perforated receptacle.

In some examples, the receptacle can include a bottom portion having a bistable domed shape for facilitating perforation of the receptacle without interference with the frozen content. The frozen content can be formed to include a through-hole in the body thereof such that a liquid injected into the container can flow through the through-hole.

The disclosed subject matter includes a process for producing a liquid beverage from a package containing frozen contents. The process includes providing frozen contents in a sealed container, wherein the container is configured to store the frozen contents. The process includes melting the frozen contents in the sealed container to generate a melted liquid. The process includes perforating the sealed container at a first location to permit dispensing of the melted liquid from the container to create a consumable liquid beverage.

In some examples, melting the frozen contents includes perforating the sealed container at a second location to permit injection of a heated liquid into the container to melt and dilute the frozen contents in the sealed container. Melting the frozen contents can include applying heat to the sealed container to melt the frozen contents into a consumable liquid form.

The disclosed subject matter includes a packaging system for using a packaged frozen contents to produce a liquid beverage directly therefrom. The system includes frozen contents and a receptacle defining a cavity for receiving and storing the frozen contents. The system also includes a lid for forming a sealed closure with the receptacle, the lid being perforable for permitting injection of a liquid into the cavity to melt and dilute the frozen content therein, wherein the receptacle is perforable for permitting the melted and diluted frozen contents to be dispensed therefrom in a consumable liquid beverage form.

In some examples, the receptacle comprises a bottom portion having a bistable domed shape for facilitating perforation of the receptacle without interference with the frozen content.

The apparatus and techniques described herein include a packaging system, an apparatus for melting and/or diluting frozen contents stored within this packaging system, wherein the frozen contents of the package are made from food and beverage concentrates, extracts and other consumable fluid types with or without nutrients, and various methods for delivering these melted and/or diluted contents for immediate consumption. The techniques described herein allow, for example, consumers to conveniently and spontaneously create a single-serve, or multi serve consumable beverage or liquid-based food directly from a receptacle such that the product has the desired fresh taste, potency, volume, temperature, texture and/or the like. To achieve this goal, frozen liquid contents and preferably flash-frozen contents, made from concentrates, extracts, and other consumable fluid types can be packaged in a gas impermeable, MAP packaged, full barrier and residue free recyclable receptacle. Further, this receptacle is designed to be accommodated and used by a machine-based dispensing system to facilitate the melting and/or diluting of the contents and deliver a product with desired characteristics, including taste, strength, volume, temperature and texture, so that consumers can consistently and conveniently experience a level of superb taste and freshness that is unavailable by any other means in use today.

These techniques include many combinations and permutations of packaging, methods, and apparatus characteristics that involve the functions of holding the frozen contents, configuring the frozen contents in one form or another, melting and/or diluting the frozen contents, and making them available for consumption with desired characteristics, as described above. In some embodiments, a sealed receptacle containing frozen contents is inserted into a machine. Thereafter, the machine perforates the sealed receptacle and a heated liquid is injected therein to melt and dilute the frozen contents. The machine also perforates the receptacle to permit the dispensing of the melted and/or diluted frozen contents therefrom into a secondary container in the form of a consumable liquid beverage. Other possible variations for each of these functions will be described in greater detail below.

Accordingly, there has thus been outlined, in broad terms, features of the disclosed subject matter in order that the detailed description thereof that follows may be better understood, and in order that the present contribution to the art made by the apparatus and techniques disclosed herein may be better appreciated. There are, of course, additional features of the disclosed apparatus and techniques that will be described hereinafter. It is to be understood that the phraseology and terminology employed herein are for the purpose of description and should not be regarded as limiting.

BRIEF DESCRIPTION OF THE DRAWINGS

Various objects, features, and advantages of the disclosed techniques can be more fully appreciated with reference to the following detailed description of the disclosed subject matter when considered in connection with the following drawings, in which like reference numerals identify like elements.

FIGS. 1A through 1G illustrate various embodiments of receptacle geometries and of frozen contents configured in different forms and packaged to allow a desired flow of a liquid through the frozen contents, according to some embodiments.

FIG. 3 illustrates a method of melting the frozen contents without the use of a melting/diluting liquid, but rather with some alternative source of heat, according to some embodiments.

FIGS. 4A through 4D illustrate an exemplary machine-based apparatus that can accommodate a variety of receptacles geometries, according to some embodiments.

DETAILED DESCRIPTION

Figure 1B:
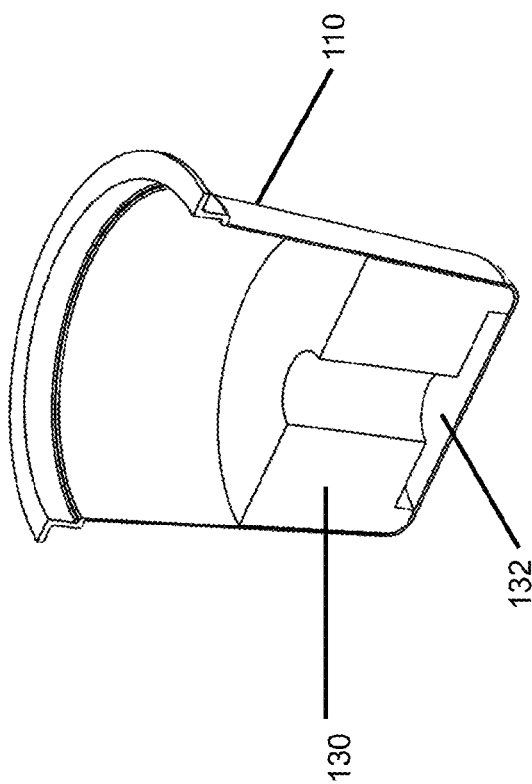

In the following description, numerous specific details are set forth regarding the systems and methods of the disclosed subject matter and the environment in which such systems and methods may operate in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are exemplary, and that it is contemplated that there are other systems and methods that are within the scope of the disclosed subject matter.

The various techniques described herein provide for the packaging of one or more frozen foods or beverage liquids, using a filterless receptacle. The filterless receptacle can be designed such that a machine-based system may accommodate the receptacle and facilitate the melting and/or diluting of the frozen contents to conveniently produce a consumable liquid beverage or food product directly therefrom with a desired flavor, potency, volume, temperature, and texture in a timely manner. For simplicity, a frozen food or beverage liquid may be referred to as the "frozen contents" or "frozen content".

In some embodiments, the liquid used to create the frozen content may be any frozen matter, which in some embodiments can be derived from a so-called extract, e.g., a product obtained through the removal of certain dissolvable solids using a solvent. For example, the extract may be created using water to remove certain desirable dissolvable solids from coffee grounds or tea leaves. Somewhat confusingly, certain extracts with a high-solids liquid are often referred to as a concentrated extract. The use of the term "concentrated" in this context may or may not be entirely accurate depending on whether the high solids content was achieved purely through solvent extraction of the solids or through a secondary step of concentration wherein solvent is removed from the liquid by some means, for example, by reverse osmosis or evaporation using heat or refrigeration, to increase its potency or strength.

The liquid used to make the frozen content may also be a pure concentrate, e.g., a product obtained only by removing water or another solvent from a consumable compound such as a fruit juice or a soup, to create a fruit juice concentrate or a broth concentrate. In some embodiments, water may be removed from milk to create condensed milk. High TDS values and/or concentrations may be desirable either to reduce transportation costs and shelf space, or for convenience, for potency and serving size versatility of created products via dilution, or for enhanced shelf life due, for example, to enhanced anti-microbial activity. These specifics are intended to exemplify variation, but any liquid food or beverage product, regardless of how it is created, falls within the scope of the present disclosure.

In some embodiments, the frozen content can be one of a coffee or tea extract, lemonade, a fruit juice, a broth, a liquid dairy product, an alcohol, a syrup, a viscous liquid, or any liquid food product. Frozen content can be matter created with or without nutritive value, may be flavored naturally or artificially, and be packaged with or without a preservative, and/or the like. The frozen contents may include carbohydrates, proteins, dietary minerals and other nutrients that support energy or metabolism. The frozen contents may be coated with carboxy methyl cellulose as an additional oxygen barrier. The frozen contents may include or be enhanced with additives such as vitamins, calcium, potassium, sodium, and/or iron, among others. The frozen contents may include preservatives such as antimicrobial additives, antioxidants and synthetic and/or non-synthetic compounds. Examples of preservative additives may include lactic acid, nitrates and nitrides, benzoic acid, sodium benzoate, hydroxybenzoate, propionic acid, sodium propionate, sulfur dioxide and sulfites, sorbic acid and sodium sorbate, ascorbic acid sodium, tocopherols, ascorbate, butylated hydroxytoluene, butylated hydroxyanisole, gallic acid and sodium gallate, an oxygen scavenger, disodium EDTA, citric acid (and citrates), tartaric acid, and lecithin, ascorbic acids, phenolase, rosemary extract, hops, salt, sugar, vinegar, alcohol, diatomaceous earth and sodium benzoate, among others. It will be understood that this listing of additives is intended to be within the scope of the techniques described herein, and the specifically referenced additives are exemplary only, and can also include derivatives thereof as well as other chemical compounds.

The frozen contents or matter may or may not have suspended solids, and may include non-dissolvable solids. In some embodiments, the concentrate, extract, or other consumable fluid from which the frozen contents are made may include additives that completely dissolve in a solvent before freezing. In some embodiments, the frozen contents may also include a mass of a composition that is not dissolved within the frozen contents during the packaging process, but is dissolved by the machine-based system during the creation of a beverage or food product with desired characteristics.

FIGS. 1A-1E show various embodiments of how the frozen contents may be structured and packaged to allow for a desired flow of a pressurized or gravity fed diluting liquid by a machine-based system through the receptacle holding the frozen contents. In addition to facilitating heat transfer to the frozen contents, the diluting liquid may be effective at creating turbulent motion to thereby expedite melting in a variety of ways that are not outside the scope of the techniques described herein. Within the receptacle, the frozen contents may be frozen into any useful shape or size.

Figure 1A:
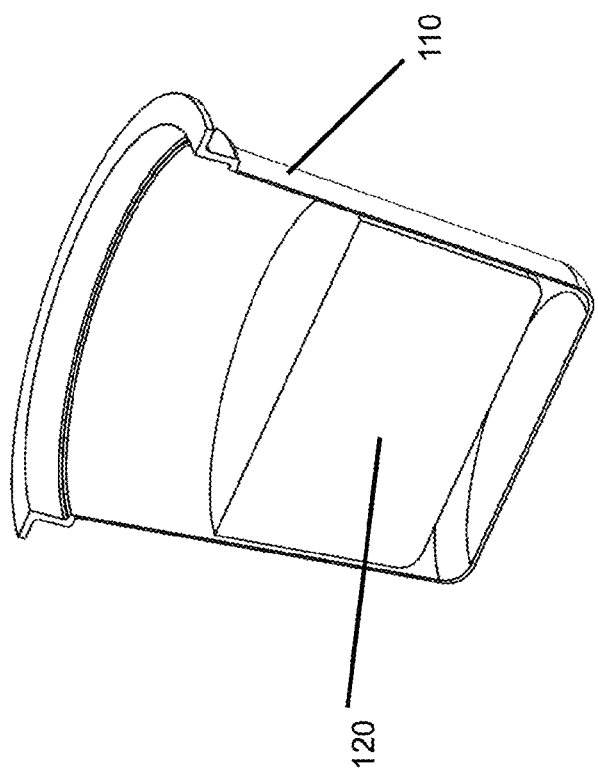

In FIG. 1A, a section view of receptacle 110 is shown (without a sealing lid in place), wherein the receptacle defines a cavity for packaging of the frozen contents 120. In this instance, the frozen contents are shown displaced away from the bottom portion of the receptacle to allow clearance for an exit needle perforation and to create a pathway around the outer surface of the frozen contents in the receptacle for creating a desired flow of a melting/diluting liquid through the receptacle and around the frozen contents to produce a beverage of a desired flavor, strength, volume, texture and temperature. FIG. 1B illustrates another embodiment, wherein the frozen contents have been molded to a shape configured to match the inside of the receptacle and subsequently loaded, such that the pre-molded shape defines a through-hole 130 in its body and a relief portion 132 below for accommodating an exit needle perforation to provide for a desired liquid flow there through without blockage or back pressure. FIG. 1C shows a plurality of frozen content pieces 140-180 provided in multiple and various shapes and sizes, with large interstitial spaces to provide for a desired liquid flow though the receptacle and around the frozen contents. In some embodiments the frozen contents within the sealed receptacle may include a plurality of concentrates and/or extracts or other compositions. For example, frozen contents 140 and 150 could comprise a lemonade concentrate, while frozen beverage concentrates 160, 170, and 180 may comprise a tea extract.

Figure 1E:
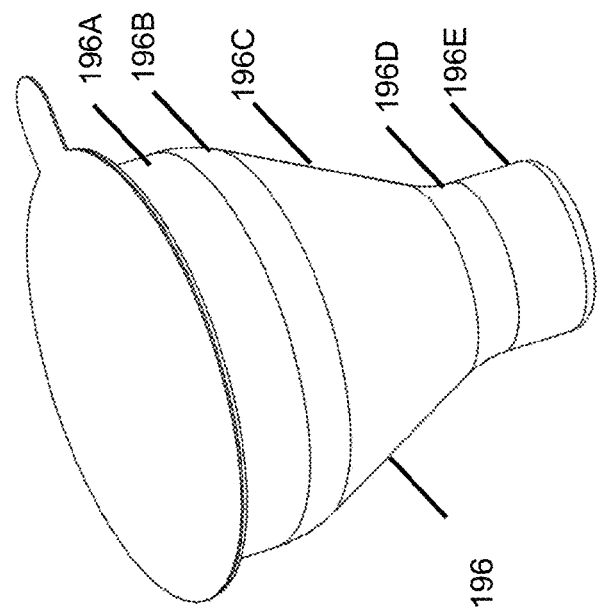

FIGS. 1D and 1E illustrate an embodiment for an alternatively shaped receptacle 115 that includes a bottom portion having a bistable dome 195. In FIG. 1D the receptacle 115 is shown in its initial condition when the frozen contents are added and frozen in place, complete with a frozen dome structure 195 in the bottom, with the dome structure in a primary or initial position, distended outwardly from the receptacle interior. FIG. 1E shows the condition of the receptacle 115 after the bistable dome 195 has been displaced to a second stable position directed inward into the cavity of the receptacle such that the frozen contents 190 are displaced upwardly, creating a space or void between the inside bottom of the receptacle and the bottom portion of the frozen contents. This displacement desirably creates a space for an exit perforation needle in the bottom of the receptacle and also creates flow paths for any melting/dilution liquid to pass around the outside of the frozen contents.

Figure 1F:
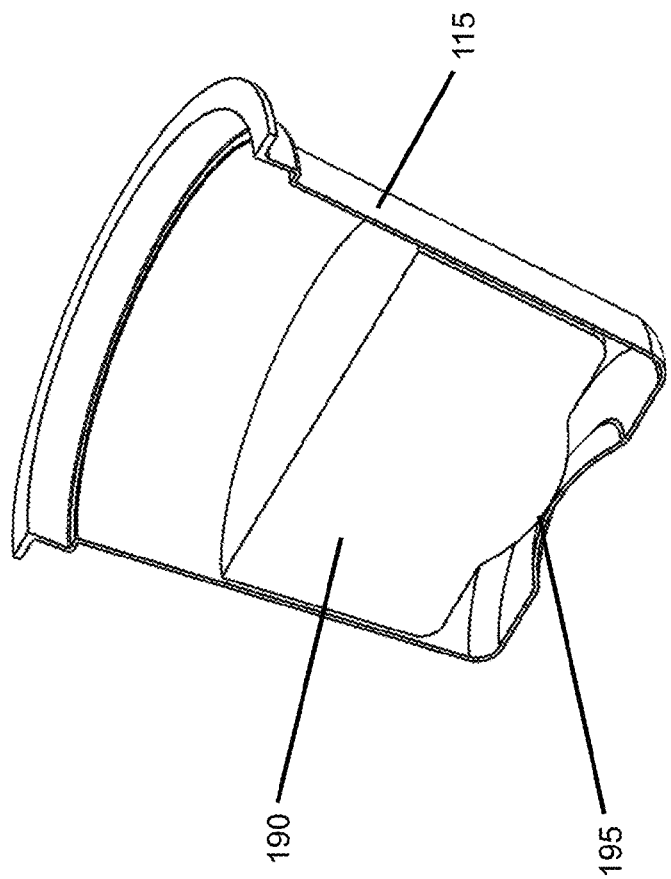

FIG. 1F illustrates a receptacle 196 comprising a multi-faceted shape. In this embodiment, the receptacle 196 includes different shape portions 196A-E. In some embodiments, the process of filling, melting and diluting a frozen content may be generally unaffected by the size or shape of the receptacle. In some embodiments, certain design considerations can be taken into account with regard to using geometries that may, for example, promote and facilitate unrestricted release of the frozen contents, accommodate needle perforation, enable the development of clearance around the frozen contents to promote a ready flow path for diluting liquids, and/or the like. For example, one or more of such design considerations can be met with positive (non-locking) draft in the sidewalls of the receptacle where it is in contact with the frozen contents. Draft can be achieved by, for example, tapering the sidewalls of the receptacle, such as tapering the sidewalls outward from bottom of the receptacle to the top of the receptacle (e.g., the diameter of the receptacle gets larger nearer the top of the receptacle). This can create a positive draft such that pushing up on the frozen contents within the receptacle from below creates clearance around the sides of the frozen contents (e.g., which avoids mechanical locking of the frozen contents against the sides of the receptacle). Such positive draft can also be used to create a natural flow path for diluting liquids to travel through the receptacle, such as liquids flowing from an entry needle to an exit needle that perforate the receptacle.

Figure 1G:
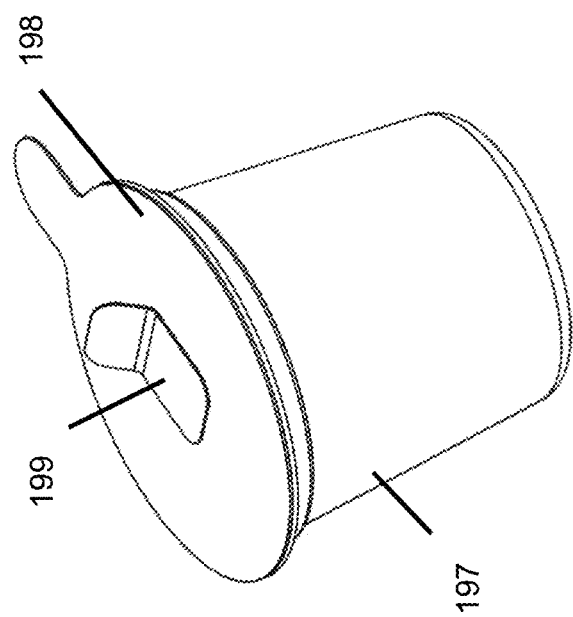

FIG. 1G illustrates a receptacle 197 with a lid 198 that includes a pull tab 199 that may be removed by the consumer. The pull tab 199 can be removed to facilitate use of a straw or similar device in combination with the receptacle 197. As another example, the pull tab 199 can be removed to facilitate introduction of diluting fluids into the receptacle 197.

Figure 2A:
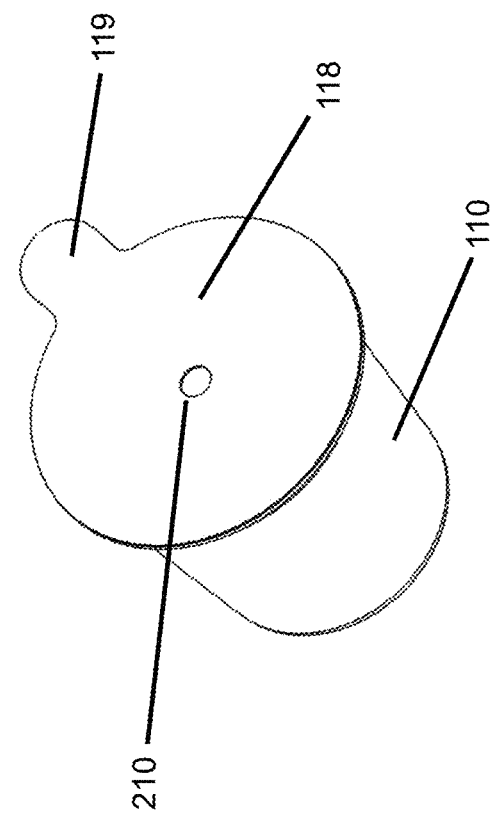
FIGS. 2A through 2D illustrate various embodiments showing how the dilution system may add or deliver a liquid to/from the frozen contents by piercing the packaging and externally and controllably heating the packaging so melting and dilution is a result, according to some embodiments.

FIG. 2A illustrates a perspective view of the receptacle, including a formed seal closure such as a lid structure 118, which may include a puncture 210 therein, whereby, in some embodiments, a dilution fluid, which may also act as a melting agent, can be introduced into the receptacle. The lid structure 118 can include a tab 119 for allowing manual removal of the lid to access the frozen contents without a need for perforation of the lid in certain instances. This lid structure can be made from the same material as the receptacle to better support efforts toward recycling. The lid structure can be made of sufficient gage thickness to adequately withstand internal pressure created by, for example, the melting/diluting liquid. The lid may be attached to the receptacle by any suitable means such as, for example, heat sealing or crimping, and the function can be achieved by any mechanism or form of the lid that seals the internal cavity and acts as a barrier against gas or moisture migration.

Figure 2C:
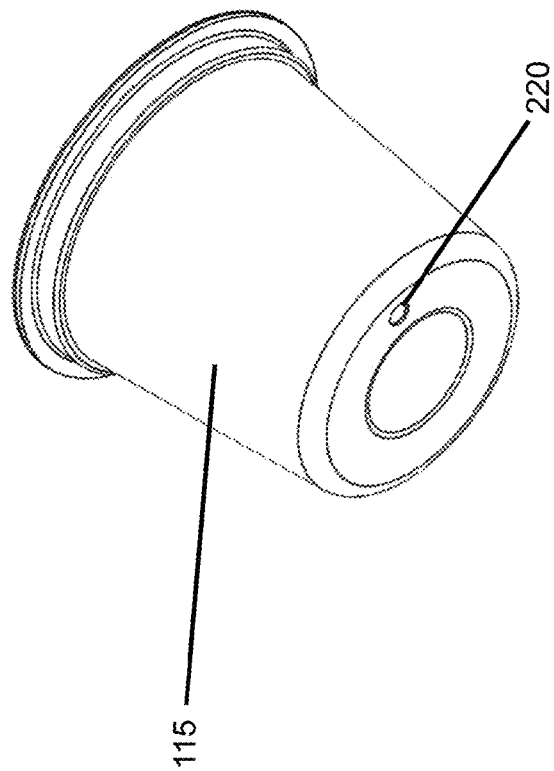
Figure 2B:
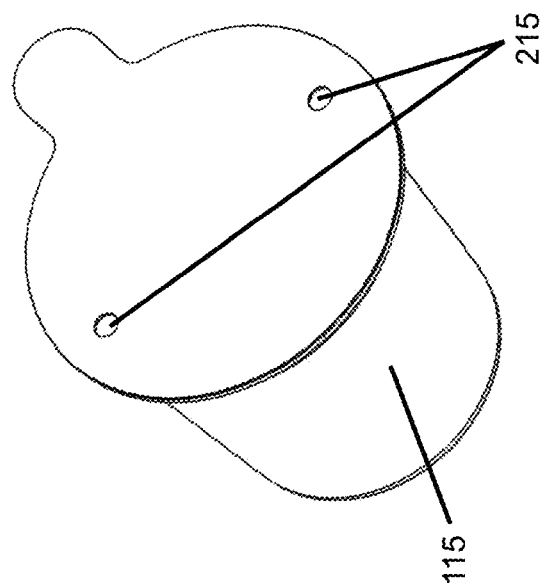

FIG. 2B shows an alternative embodiment of a punctured lid including two perforations 215. FIG. 2C illustrates a bottom puncture 220 to allow the dilution liquid to exit the sealed receptacle. These examples are meant to be illustrative, however, as the puncture, or punctures, may be made anywhere on the receptacle. The punctures may be made in a specific location to dispense a solvent, diluting agent, or liquid, such as water for a desired melting and dilution environment, and ultimately the creation of a desired beverage in a timely manner. The punctures may be of any size as needed, for example, to allow oversize solids (frozen or non-dissolvable solids) to be dispensed from the receptacle. In some variations, the perforation may be made to allow frozen structures of a specific size to escape and to be distributed from the receptacle to create a fluid, iced, slush, or smoothie-like beverage. In addition, multiple punctures may be advantageous in providing venting of the receptacle when melting/diluting fluid is input therein.

Figure 2D:
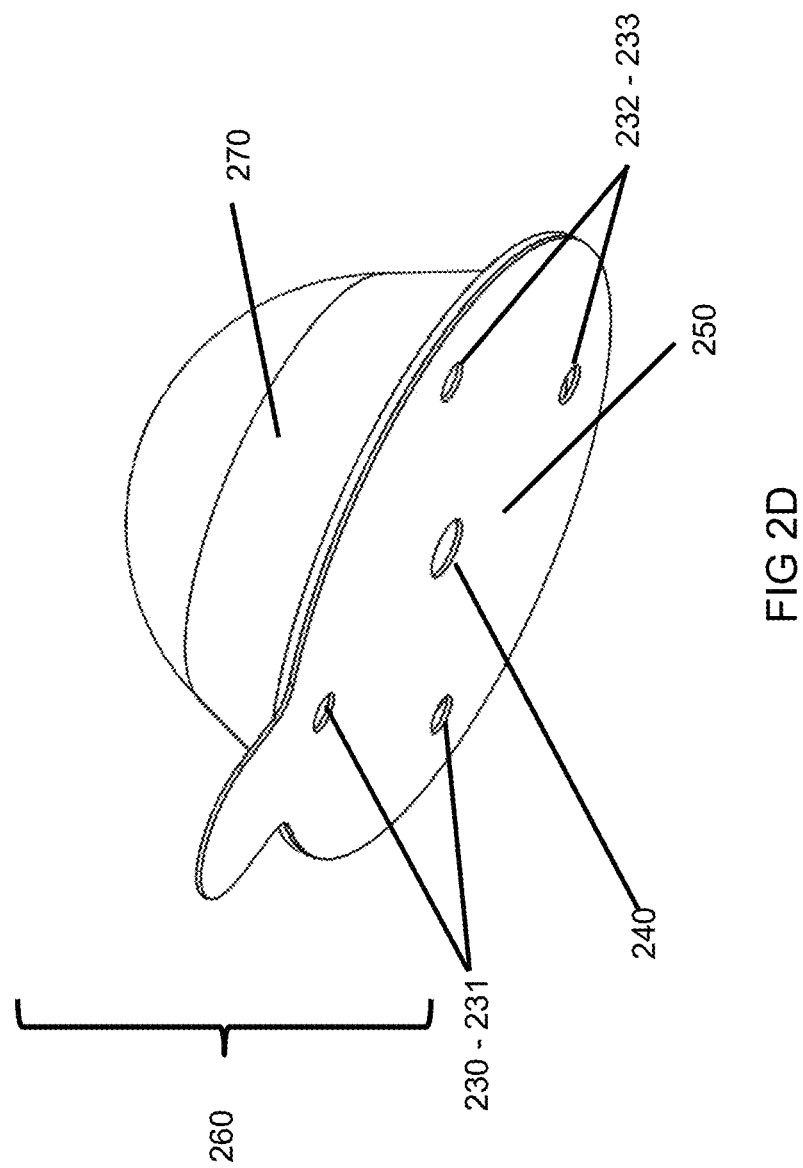

FIG. 2D illustrates an embodiment having four punctures (230-233) situated in proximity to the periphery of a receptacle 270 for entry of a liquid through the lid 250 of a receptacle 260 that is loaded top-down into a machine-based system. As shown in this embodiment, a puncture 240 may be provided near the center of the receptacle lid for allowing the melted and diluted frozen contents to exit the receptacle. In this figure, the frozen contents (not shown) are frozen within the domed bottom of the upside down receptacle to allow for a desired flow environment. The melted and diluted liquid, in this example, may flow out of the receptacle into a secondary receptacle for consumption.

In some embodiments, the frozen contents contained in these receptacles can be better preserved when deaerated, or deoxygenated, including use of deaerated or deoxygenated solvents (e.g., water) during an extraction process when appropriate. In some embodiments, the liquid used to make the frozen contents may be frozen at a time of peak quality in terms of freshness, flavor, taste and nutrition. In some embodiments, such as for a coffee-based beverage, the frozen content is flash-frozen during the period of peak flavor immediately following brewing to preserve the optimum taste, aroma and overall quality and thereafter distributed in a frozen state for preserving taste and aroma thereof. For example, an espresso concentrate may be preserved and may taste best when it is ground within an 8 to 36 hour period following roasting, and brewed immediately after grinding using deoxygenated water. By flash freezing the liquid concentrate, extract, or other consumable fluid during this period of peak flavor immediately following brewing, it is possible to capture the peak flavor, optimum taste, aroma and overall quality of the brewed liquid. Further, by packaging this flash frozen liquid in a gas impermeable and recyclable receptacle using MAP techniques (as described further herein), and providing the frozen contents are maintained in a frozen state during subsequent storage and delivery to the final consumer, the fresh flavor can be maintained almost indefinitely.

In some embodiments the packaging may be distributed above freezing if the quality of the content can be maintained by some other FDA food safe method e.g., a syrup used to make carbonated beverages. In some embodiments, the frozen contents may be frozen and never melted, melted once or numerous times during distribution. Distributing and maintaining the receptacles at a temperature below the freezing point of the frozen contents may increase aspects of quality preservation and nutrient-rich food safety, but is not required for all embodiments. In some embodiments, the beverage concentrate is flash-frozen and kept frozen in its receptacle until it is ready to be melted and/or diluted immediately prior to being prepared for consumption.

In some embodiments the frozen content can also be packaged as a plurality of frozen contents, configured in a layered or blended format. In some embodiments, the frozen contents can be configured in any shape or multiple geometric shapes so long as the contents will fit within the cavity volume of the receptacle. In some embodiments, the frozen contents may be crushed or macerated to increase the surface area of the frozen contents to increase melting rates.

In some embodiments the liquid comprising the frozen content may be frozen after it has been measured into the receptacle. In some embodiments the liquid that includes the frozen content may be frozen prior to delivery to the receptacle, e.g., pre-frozen in one mold or by other means and then deposited in the receptacle as a frozen solid of some desirable shape. Stated another way, the frozen contents may be created in a first phase or separate step, and then received, inserted and sealed in a receptacle that can be accommodated by a machine-based dispensing system. In some embodiments the liquid beverage concentrate is received as a slurry or liquid, to be frozen, and sealed in the receptacle in turn, or in unison. In some embodiments the frozen contents are of a potency, shape, size, and are structured within a receptacle such that a machine-based system can easily melt and/or dilute the frozen contents, converting the contents to a consumable liquid of a desired flavor, potency, volume, temperature, and texture.

In some embodiments the receptacle for holding/storing the frozen contents of the techniques described herein includes a cup-shaped portion having a bottom, a continuous sidewall extending from the bottom, and a sealable access opening defined by the continuous sidewall.

In some embodiments the receptacle can include a cavity for storing the frozen content. The packaging in which the frozen contents are sealed, can be referred to as a "receptacle," which can include a cartridge, a cup, a package, a pouch, a container, a capsule or the like. The receptacle can include, for example, both the portion of the packaging which includes the open cavity (e.g., bottom and sidewalls) without a lid/closure, and can also include the complete package, including the portion of the packaging that includes the open cavity and the lid/closure. The receptacle can be in any shape, styling, color or composition. The packaging may be flexible or have a definitive shape. In some embodiments the receptacle's outer surface is colored or coated with a material designed to enhance absorption of infrared energy that may be used to heat and/or melt the frozen contents. In some embodiments the shape of the receptacle's sidewall, when seen in section view from the top, would be the shape of a star or other non-circular shape, e.g., one whose perimeter surface area would be much greater than that of a smooth cylinder or cone and thereby promote heating and melting of the frozen concentrate proportionally faster.

In some embodiments, the receptacle includes a closure for sealing the receptacle to assist in maintaining a MAP gas environment. In this case, a hermetic seal formed between a lid and the receptacle may be accomplished using a variety of methods, including, but not limited to a patch, glue, a cork, heat sealing, crimping, and/or the like. In some embodiments, the closure may be designed to be manually removable, e.g., with a pull tab on a lid as previously noted, so that the frozen content can be used in other ways if a machine-based system for preparing a consumable beverage is not available. In some embodiments, the apparatus may require a manual perforation instead of a machine implemented perforation before loading the receptacle into the machine-based dispensing system.

The frozen contents may be packaged in a material that provides control of gas migration, e.g., the receptacle may be comprised of a gas impermeable material for creating a long lasting storage package for preserving freshness and aroma of the packaged frozen contents. For example, the receptacle may be comprised of an aluminum substrate or other metal material and typically prepared with a coating approved by the FDA for contact with food, if needed. As another example (e.g., if recyclability is not a critical concern), the receptacle may be comprised of a multi-layer barrier film including, for example, a layer of EVOH plastic. In some embodiments, if the receptacle is fabricated from a metal, the receptacle will preferably be made from a highly thermally conductive material such as aluminum and thereby be supportive of faster heat transfer, especially if a heated dilution liquid is not the primary means for melting the frozen contents. In some embodiments the packaging may include edible packaging materials that may be dissolved and consumed. In some embodiments the receptacle and its closure are comprised of a gas impermeable, recyclable material such that a spent receptacle, including the closure and other packaging features, can be recycled in its entirety In some embodiments the frozen contents may be packaged with no headspace or limited headspace. Headspace refers to any excess atmosphere within a sealed receptacle, typically located between a top portion of the frozen contents and the lid or closure portion of the receptacle. Furthermore, any headspace in the packaging receptacle may be advantageously filled using a MAP gas, such as argon, carbon dioxide, nitrogen, or another gaseous compound which is known to be less chemically active than air or oxygen. In some embodiments the top or outermost layer or envelope of the frozen contents may be layered with a frozen, deaerated coating of water which may act as a preservative barrier. In some embodiments the top or outermost layer or envelope of the frozen contents may be layered with a coating of carboxy methyl cellulose which may act as a preservative barrier. In some embodiments the frozen contents are vacuum sealed in a flexible receptacle. In some embodiments the frozen contents are packaged in a receptacle in a manner that minimizes the surface area contact of frozen contents with the atmosphere, especially oxygen gas, but also any gas that carries off aroma.

In some embodiments the receptacle is coated on the inside with a material that significantly reduces the force needed to dislodge the frozen contents from the sides or bottom of the receptacle to facilitate movement of the frozen contents out of the way of a perforating needle and to create unrestricted pathways for diluting liquids to pass around the exterior surface of the frozen contents en route to the exit perforation. In some embodiments the bottom of the receptacle incorporates a bistable dome structure which can be distended downward, away from the bottom of the receptacle during filling and freezing of the liquid contents and subsequently inverted upward to its second stable position after freezing to hold the frozen contents well away from the bottom of the receptacle to facilitate needle penetration and/or flow of diluting liquids around the exterior surface of the frozen contents en route to the exit perforation. In some embodiments the bistable dome is inverted at the factory prior to shipment of the product to consumers. In some embodiments the bistable dome is inverted by the consumer immediately prior to use or by the machine as a part of insertion and needle penetration. These two embodiments are merely examples and not cited to limit the functions or features of the receptacle that may facilitate dislodging frozen contents or beverage creation.

In some embodiments the frozen contents may be packaged and structured in a receptacle of a specific size and shape that allows the receptacles to be accommodated by current machine-based dilution systems or systems on the market that are designed for extracting solutes or brewing coffee for the facilitation of creating a beverage of a desired flavor, potency, volume, temperature and texture.

In some embodiments the packaging of the frozen contents includes additional barriers or secondary packaging that protects the frozen concentrates from melting or exposure to ultraviolet light during distribution. For example, packaging frozen contents in a receptacle that is further packaged within a cardboard box adds a layer of insulation and would thereby slow temperature loss or melting of the frozen contents, e.g., when such temperature loss or melting is undesirable.

In some embodiments of the present techniques, the apparatus for creating a beverage from frozen contents advantageously includes a receptacle that is filterless, as distinguishable from the filtered receptacles currently available, as exemplified, for example, by U.S. Pat. No. 5,325,765, among other filtered beverage receptacles. A filterless receptacle, combined, for example, with the virtually complete removal of the frozen contents during melting and/or dilution and subsequent delivery and with the use of a homogeneous material of construction for the receptacle, renders the receptacle ideally suited for recycling.

In some embodiments the receptacle is configured to be accommodated by a machine-based system and capable of receiving a liquid dispensed therefrom to further facilitate the melting and/or dilution of the frozen contents into a consumable liquid product with a desired set of characteristics.

In some embodiments the receptacle may be large enough that it can contain the melted contents and all of the added dilution liquid from the machine-based system and the finished product can be consumed immediately therefrom. The perforation used to add dilution liquid may be suitable for subsequent use with a straw or other means to allow consumption directly from the receptacle, as opposed to dispensing the diluted and/or melted contents into a secondary container.

In some embodiments the receptacles with frozen contents are provided in a controlled portion arrangement, wherein the controlled portion arrangement can comprise a single-serving sized format, or a batch-serving sized format for producing multiple servings. In some embodiments the machine-based system may accommodate the receptacle, or a plurality thereof, in any method, shape, or form to facilitate the melting and dilution of the frozen contents. In some embodiments a machine-based system may accommodate multiple receptacle types and sizes for a larger array of product possibilities.

In some embodiments the receptacle may be perforated either by the consumer or by the machine-based system. For example, the consumer may remove a patch to expose a perforation built into the receptacle before it is received by the machine-based system. Alternatively, the machine-based system may perforate the sealed receptacle using a variety of methods, including a puncture needle or pressure to rupture the receptacle.

In some embodiments the packaging may become perforable only after exposure to higher temperature or mechanical action. For example, the packaging may be made of a sponge-like material that the frozen contents can permeate when heated.

As previously stated, the perforation may be a single hole. In some embodiments multiple perforations may be provided in the receptacle at multiple locations. In general, since there is typically no need for filtration of the melted frozen contents, the perforations described herein are primarily intended for the introduction of a melting/diluting liquid or to allow the melted frozen contents to exit the receptacle. Thus, the multiple perforations are not typically designed to serve as a filter. In some embodiments, the receptacle is perforated and means are introduced to displace the entire frozen contents out of the receptacle before melting and diluting. The machine-based system may displace the frozen contents, or the consumer may displace the frozen contents, remove it from its packaging, and load only the frozen contents into the system. In some embodiments the receptacle is perforated by the machine-based system in a location that allows the entire frozen contents to exit the receptacle before or after melting so as not to waste any of the beverage product and to remove any recycling contaminants from the receptacle.

The perforation may be made before, after, or during the time when the frozen contents are melted and/or diluted. In some embodiments the frozen contents are melted and exit the receptacle before being diluted by a dispensed diluting agent for an ideal beverage. In some examples of the present techniques the frozen contents may be diluted using a dispensed liquid before the contents are melted and distributed into a subsequent or secondary receptacle. In some embodiments the frozen contents are melted and diluted simultaneously. For example, in some embodiments, a liquid may be introduced into the receptacle containing frozen contents to melt and dilute the frozen contents simultaneously or in unison.

Although passing a liquid around or through the frozen contents within a receptacle can be effective at expediting melting rates, other methods exist to achieve the same outcome and enhance the speed of this process. FIG. 3 illustrates a method for producing a desired beverage that does not use a flowing liquid to simultaneously melt and dilute the frozen contents. The frozen contents 310 are enclosed in a perforable receptacle. The receptacle 320 is perforated and accommodated by a machine-based system and the frozen contents are liquefied via a melting component such as an external heat source or the like. The process for producing a consumable liquid product from a frozen content of the techniques described herein may be carried out by an initial step of providing the content in a sealed receptacle for storing therein. The receptacle is accommodated by a machine-based system that applies heat to the receptacle via an external heat source for melting the frozen beverage into a consumable liquid beverage form, wherein the sealed enclosure is perforated for permitting dispensing of the consumable liquid beverage directly from the sealed enclosure.

Further referring to FIG. 3, the melted beverage content 330 exited from its receptacle is diluted with an additional liquid dispensed via the machine-based system in a secondary step or in unison with a desired diluting agent. The melted contents may be dispensed undiluted, before, after, or simultaneously with the addition of a distinct liquid for dilution. This may include capturing the melted beverage content in a liquid reservoir that mixes the two liquids before being dispensed together by the machine-based system. When distributed, a secondary receptacle 340 receives the melted contents and diluting agent when appropriate.

In some embodiments, a secondary receptacle used to collect the melted/diluted contents may include any receptacle known to hold liquid food or beverages. This secondary receptacle could be a container, thermos, mug, cup, tumbler, bowl, and/or the like. This secondary receptacle may or may not be included in the secondary packaging. An example of this would be a consumer package with a soup bowl containing instant rice or noodles sold along with a receptacle of frozen broth concentrate that combines to make a bowl of soup after the frozen contents are melted and/or diluted and discharged into the secondary packaging. Alternatively, the secondary receptacle may be separately provided by the consumer.

In some embodiments, the consumer may desire a beverage with no dilution of the frozen contents. e.g., the frozen contents are already at the correct flavor, volume and potency. For example, the frozen contents may already be at a desired TDS level for consumption, e.g., an espresso, or hot fudge sauce and need to only be melted and dispensed at the desired temperature and texture. For example, the machine-based system may melt the frozen contents by putting a thermally conductive receptacle against a coil heater or by irradiating it with infrared light or by impinging a heated gas against the outside of the receptacle and then puncturing the receptacle after the contents reach a desired temperature. Furthermore, the frozen contents may be conveniently dispensed from the machine-based system into a subsequent container. In some examples, the lid is removed prior to or after melting and heating for direct consumption from the receptacle.

FIGS. 4A through 4D illustrate an exemplary machine-based apparatus that can accommodate a variety of different receptacles, according to some embodiments. The system can be, for example, a melting system. The receptacles can include, for example, a variety of different filterless receptacles, of varying sizes and shapes, each holding some amount of frozen contents. The apparatus can be configured to perform melting, diluting, and delivery functions for the purpose of creating a beverage or food product with desired characteristics, as described herein.

In FIG. 4A, the system 400 includes a cassette 430 into which receptacles of different sizes and/or shapes can be loaded. Once loaded with a single receptacle, the cassette 430 can be slid into place, with the receptacle passing through a clearance tunnel 435 until it is centered on the main system body 410. Instructions for use of the melting system 400 can be communicated to a user via a display 420. Solvent (e.g., water) to be used for melting/diluting the frozen contents of the receptacle is stored in the holding tank 440 until needed.

Figure 4B:
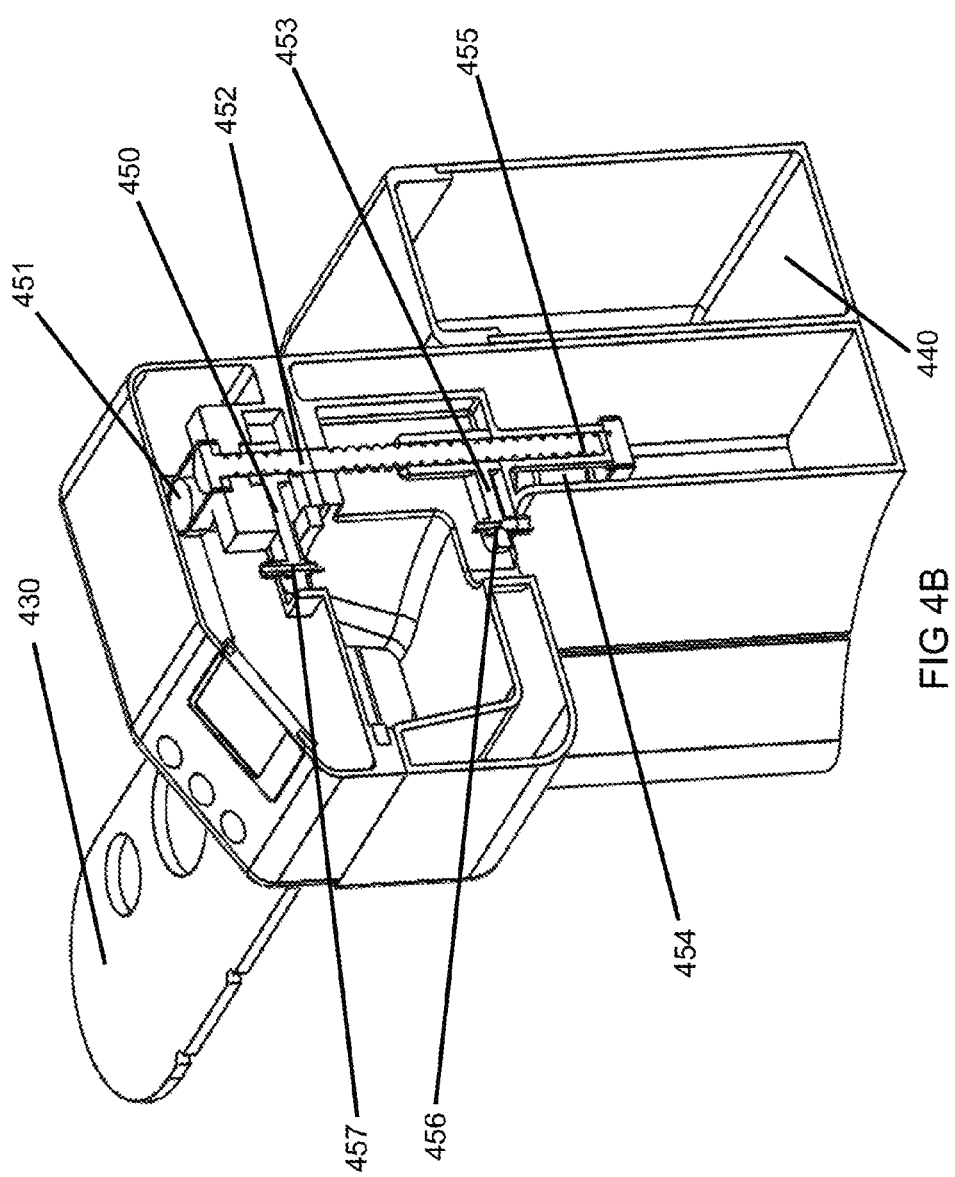

Referring to FIGS. 4B and 4C, once the receptacle is properly placed for interaction with the system, a needle support arm 450 is moved downward using any known means, which, by way of example only, could include a motor 451 and a screw 452, until the needle 457 punctures the top of the receptacle. Depending on the receptacle design and its contents, a second needle support arm 455 can be moved upward to penetrate the bottom of the receptacle using a similar motor 454 and drive screw 455. A heater, such as a plate heater or an IR heating source (not shown) may be used to preheat or melt the frozen contents depending on the selected product and process desired. When needed, a melting/diluting liquid stored in a holding tank 440 can be passed through a heat exchanger (not shown), using tubing (not shown), to pass through needle 457 and into the now punctured receptacle. Thereafter the melted liquid can exit from the receptacle through needle 456.

Figure 4D:
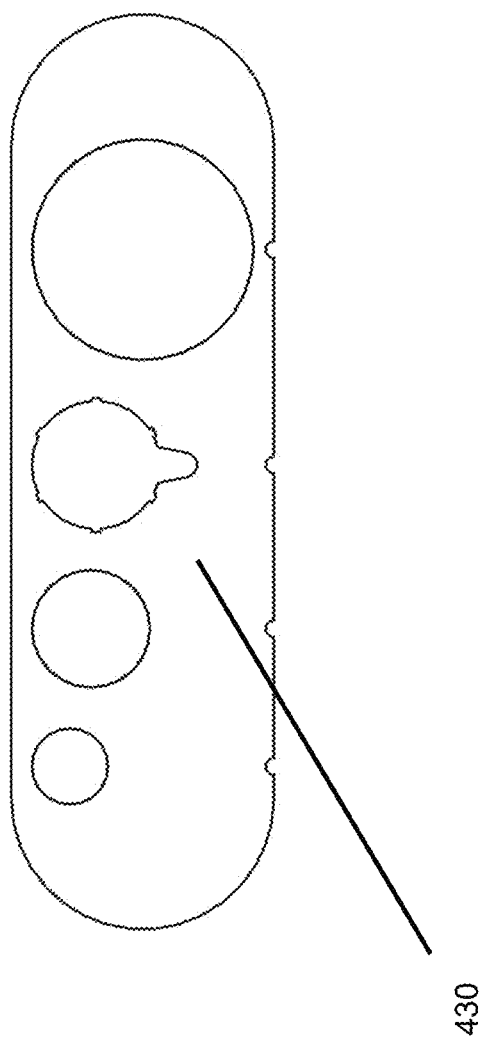

FIG. 4D illustrates one embodiment for a cassette or other device that is capable of holding a variety of receptacle sizes and shapes to allow a wide range of beverages, soups, etc. to be used with a melting apparatus.

Figure 5:
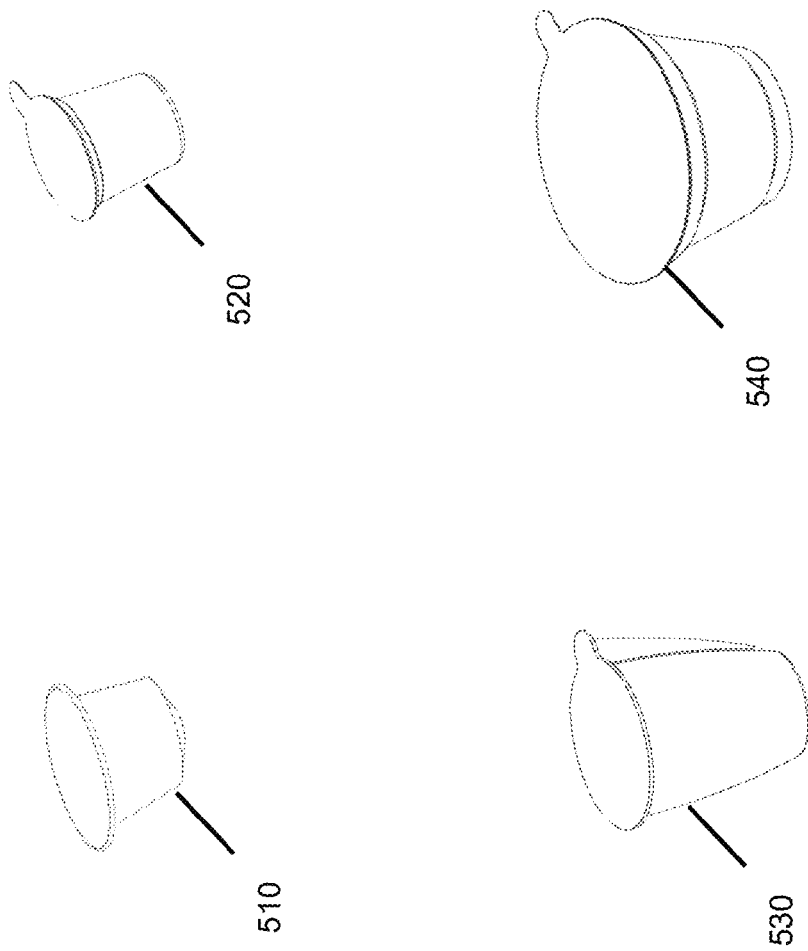
FIG. 5 illustrates a range of exemplary packaging options and receptacle shapes that could be accommodated by a machine-based apparatus, according to some embodiments.

FIG. 5 illustrates a range of receptacle sizes and shapes that could be accommodated by the cassette of the machine (e.g., cassette 430 of FIG. 4A). With different cassettes, each interchangeable with the original, but with differing hole sizes and shapes, an unlimited number of different receptacles can be accommodated by the brewer. It will be recognized by one skilled in the art that the process of filling, melting and diluting a frozen content may be, in some embodiments, generally unaffected by the size or shape of the receptacle.

The melting system may use any source of heat, motion, or a combination thereof to expedite the liquefaction of the frozen contents. Therefore, the melting system may include various sources of heat and/or motion. Electromagnetic radiation, a heated coil, hot air, a thermo-electric plate, a heated liquid bath, and the like are all examples of possible sources of heat that may expedite the rate of melting. In addition, motion may be introduced using a centrifuge or vibration platform or the like as a means of expediting the melting rate. One skilled in the art, however, will recognize that various other physical action principles and mechanisms therefore can be used to expedite liquefaction. As described herein, manual or automatic (electronic) machine-based methods can be used to expedite the melting and an increase in temperature of the frozen contents using various forms of motion and/or heat. The finished food or beverage serving can be made from the frozen content of the receptacle at the temperature desired by the consumer, and via a method that is appropriate for direct consumption by the consumer.

In some embodiments a component of the machine-based system used for dilution may include a liquid reserve, or a plurality thereof. In some embodiments the machine-based system may connect to a piping system that distributes a diluting agent from a larger liquid reserve or from an appropriate plumbing system, e.g., a filtered water system tied into a building's water supply. The diluting liquid may be water, however, any liquid, including carbonated liquids, dairy liquids, or combinations thereof, including any nutritive or non-nutritive liquids suitable for human consumption, may be used to dilute the frozen contents to a desired composition. In some embodiments, the liquid for dilution may be carbonated to create soft drinks and the machine-based system may include a carbonating component. In some embodiments, a diluting liquid may be increased to a certain temperature or pressurized so as to melt the frozen contents with room temperature or chilled fluids to make chilled or iced beverages.

In some embodiments for creating desired products that require dilution, a diluting agent is heated and/or allowed to flow to create a consumable liquid product of a desired flavor, potency, volume, temperature, and texture in a just-in-time manner from the frozen contents. In some embodiments the diluting component may also act as the melting component. In some embodiments a diluting agent is heated and/or allowed to flow such that it complements an arbitrary melting component (e.g., an electric heater) to create a consumable liquid product with desired characteristics in a timely manner.

In some embodiments the variables of the melting component, or plurality thereof, and dilution components, or plurality thereof, are programmable and adjustable to create a wider range of characteristics for creating beverages and liquid food products. For example, decreasing the temperature of a pressurized liquid used for dilution will decrease the temperature of a consumable liquid product created by the machine-based system and apparatus.

In one specific example embodiment, presented for illustrative purposes only, a frozen 1 oz. coffee extract with a TDS of 12, may be packaged in a receptacle and accommodated by a machine-based system that expedites the melting of the frozen contents by delivering heated water to the receptacle to melt and dilute the contents thereof with 7 ounces of 200 degree water to create a single-serving of 8 ounces of a hot coffee beverage with a TDS of 1.5 at a desired temperature. In some embodiments, other measurement techniques can be used in place of TDS, such as BRIX. Alternatively, with adjustable dilution settings, the frozen coffee extract used in this example may be melted and diluted with only 1 ounce of water to create a 2 ounce espresso style beverage of a desired temperature with a TDS of approximately 6. Furthermore, the receptacle may only be heated such that the frozen extract barely melts, such that it may be added to a consumer provided liquid, like milk for a chilled or iced latte or another iced beverage like a juice, iced coffee or tea.

In some embodiments, the variables defining the frozen contents, like temperature, volume, shape, size, portionality etc. can also be adjusted during manufacturing of the liquids used to make the frozen contents to better facilitate making a desired food or beverage from a machine-based system with limited machine settings/controls. For example, freezing a larger volume of a less potent liquid as the basis for the frozen contents in a given receptacle may be used to create a beverage of a lower temperature, ceteris paribus.

It may also be contemplated as part of the techniques described herein that the machine-based system includes sensor technology that can automatically adjust the settings of the melting and/or dilution component to produce a desired beverage or liquid food outcome. The perforation properties may also be programmable or automatically established using sensor technology that assists in recognizing the receptacle type, size, contents, bottom location and other properties. This sensor technology may also be used to inhibit certain settings from being applied. For example, a frozen broth concentrate receptacle may inhibit a consumer from implementing settings that would over-dilute and waste the product. As another example, a frozen broth concentrate receptacle may inhibit a consumer from implementing settings that would overheat, for example, an orange juice concentrate. In some embodiments, this sensor technology assists in creating a desirable product and eliminating human error.

In some embodiments, the melting and/or diluting controls may be programmable or established using bar coded instructions on the receptacle to achieve a product satisfying a consumer's individual preference. The machine-based system may detect and read bar codes, QR Codes, RFID tags, or other machine-readable labels. In some embodiments at least one criterion of the receptacle or frozen contents establishes or inhibits the settings of the accommodating machine-based system for creating a desired product. These criteria might include, but are not limited to, weight, color, shape, structure, and temperature. In some embodiments the machine-based system may include a thermocouple or infrared thermometer to detect the temperature of the frozen contents and/or its receptacle and automatically adjust its settings to create a beverage of a desired flavor, strength, volume, temperature, and texture. This may include disabling the dilution function and engaging a melting component that does not dispense a liquid. Furthermore, the consumer may enter an exact desirable characteristic, like temperature or potency, and the machine-based system may use this in combination with available sensor technology to achieve the desired parameters.

It should be understood that a machine-based system may include functions that may also be used to successfully create a beverage from a receptacle containing a dry ground material (e.g., coffee grounds) and a filtering system as is commonly available today. In addition, the machine-based system may be designed to create desirable beverage and liquid food products from a variety of receptacle styles, receptacle sizes and frozen contents. In some embodiments, the machine-based system may include a mechanical function to distinguish and limit controls and settings for beverage creation.

Furthermore, the machine based system may include a mechanical function that is necessary for product creation for different receptacle and frozen content types. In some embodiments the frozen contents may be crushed or macerated by the machine-based system to increase the surface area of the frozen contents to increase melting rates. This mechanical function may be initiated manually by the consumer or automatically implemented by a sensor trigger. For example, it has been contemplated herein that dislodging frozen contents from receptacle walls may create issues and make it difficult to pierce the receptacle where it is in contact with the frozen contents. In some embodiments the machine may recognize the specific frozen receptacle type, discriminating it from other frozen and dry ground receptacles, using sensed criteria, like weight or temperature, and mechanically adjust the receptacle so it can be perforated in a specific location where no frozen content is in contact with the receptacle. This may include flipping the receptacle upside down.

In some embodiments the machine-based system melts and dilutes the frozen contents by flowing or pushing a specific amount of liquid, which may be heated and/or pressurized, through the receptacle to completely melt and dilute the frozen contents to a desired flavor, strength, volume, temperature, and texture. In combination with this embodiment, the machine-based system may include an additional melting component, such as a receptacle heater, or heated puncture needles or the like, to facilitate the creation of a desired consumable liquid that the consumer does not desire to dilute. In some embodiments the flowing liquid melts the entire frozen contents to eliminate waste and rinses the receptacle of any residue or contaminants as part of the melting or dilution process so that a receptacle of a homogeneous material is rendered free of residues and is thus converted into an easily recyclable form. In some embodiments, focused specifically on recycling, the manufacturer would introduce a deposit requirement for each receptacle to encourage its return to the point of sale for a deposit refund.

In some embodiments the frozen food or beverage liquid is packaged to handle a flowing diluting liquid without an overflow. Again, this specific apparatus may involve freezing the food or beverage liquid into specific geometric shapes, structures, and proportionality to provide necessary flow paths through the receptacle to its exit.

For clarity, illustrative embodiments for different aspects of the system have been described with respect to the type and design of the receptacle, the nature of the frozen content, the means for melting and/or diluting the frozen content, and the delivery mechanism applied to the resulting melted liquid to create a consumable food or beverage on a just-in-time, consistent basis at the desired flavor, potency, volume, temperature, and texture. It will be apparent to one skilled in the art that these various options for receptacle type, form and characteristics of the frozen content, mechanisms for melting and/or diluting the frozen contents, and means for delivery of the liquefied contents can be combined in many different ways to create a pleasing final product with specific characteristics which can be conveniently enjoyed by the consumer.

The invention claimed is:

1. A receptacle comprising:
    a sidewall comprising a tapered portion that increases in dimension from a first end of the receptacle to a second end of the receptacle;
    an end layer disposed at the first end of the receptacle, wherein the end layer is defined by a sheet with no openings and the end layer comprises a bistable dome, wherein the sidewall and the end layer define a cavity of the receptacle, and wherein the second end of the receptacle defines an opening;
    a solid frozen liquid content disposed in the cavity of the receptacle; and
    a perforable closure formed over the opening of the receptacle sealing the receptacle, wherein:
        the solid frozen liquid content, at least a portion of the sidewall, and at least a portion of the perforable closure define an empty space in the receptacle lacking solid frozen liquid content;
        the receptacle is configured for insertion into a dispensing apparatus;
        the end layer of the receptacle is perforable by a needle disposed within the dispensing apparatus;
        the solid frozen liquid content has a first position and a second position within the cavity, wherein, in the first position, the solid frozen liquid content conforms to substantially the entire end layer of the receptacle, and wherein, in the second position, the solid frozen liquid content is displaced away from the end layer of the receptacle and into the empty space, and further wherein, in the second position, at least a portion of the empty space remains unoccupied by the solid frozen liquid content; and
        the bistable dome has a first stable orientation extending away from the cavity when the solid frozen liquid content is in the first position within the cavity and the bistable dome has a second stable orientation extending into the cavity when the solid frozen liquid content is in the second position within the cavity.

2. The receptacle of claim 1, wherein the receptacle comprises a gas impermeable material configured to preserve freshness and aroma of the solid frozen liquid content.

3. The receptacle of claim 1, wherein the receptacle and the closure each comprise a recyclable material such that the receptacle and the closure can be recycled.

4. The receptacle of claim 1, wherein the solid frozen liquid content is selected from a group consisting of:
    a frozen coffee extract;
    a frozen tea extract;
    a frozen lemonade concentrate;
    a frozen vegetable concentrate;
    a frozen broth;
    a frozen liquid dairy product;
    a frozen alcohol product;
    a frozen concentrated soup;
    a frozen syrup; and
    a frozen fruit concentrate, or any combination thereof.

5. The receptacle of claim 1, wherein the receptacle is configured such that the receptacle:
    can be perforated before the receptacle is inserted into the apparatus;
    can be perforated while the receptacle is present in the apparatus;
    or both.

6. The receptacle of claim 1, wherein the receptacle is filterless.

7. The receptacle of claim 1, wherein the solid frozen liquid content and the receptacle are provided in a controlled portion arrangement.

8. The receptacle of claim 7, wherein the controlled portion arrangement comprises a single-serving sized format.

9. The receptacle of claim 7, wherein the controlled portion arrangement comprises a batch-serving sized format for producing multiple servings from a single or a plurality of injections of liquid.

10. The receptacle of claim 1, wherein the receptacle is configured to receive a heated liquid through the perforated receptacle to expedite liquefaction and dilution of the solid frozen liquid content.

11. The receptacle of claim 1, wherein the receptacle is configured to receive heat to expedite melting of the solid frozen liquid content within the receptacle.

12. The receptacle of claim 1, wherein the bistable dome has a partially spherical shape.

13. The receptacle of claim 1, wherein:
    the solid frozen liquid content, when in the first position, conforms to substantially the entire tapered portion of the sidewall below the empty space and the end layer of the receptacle; and
    the solid frozen liquid content is sized to be displaced into the empty space by the needle, when in the second position, to create a clearance surrounding the solid frozen liquid content, creating a flow path from the second end of the cavity, around the solid frozen liquid content, and to the first end of the cavity.

14. The receptacle of claim 1, wherein the receptacle, including the tapered portion of the sidewall, the closure formed over the opening of the receptacle, and the end layer of the receptacle, form a gas impermeable receptacle.

15. The receptacle of claim 14, wherein a portion of the sidewall at the second end of the receptacle and the closure are joined via heat sealing.

16. The receptacle of claim 14, wherein a portion of the sidewall at the second end of the receptacle and the closure are joined via crimping.

17. The receptacle of claim 14, wherein a portion of the sidewall at the second end of the receptacle and the closure are joined via gluing.

18. The receptacle of claim 1, further comprising a coating inside of the cavity at least on a portion of the tapered portion of the sidewall and the end layer, the coating reducing adhesion of the solid frozen liquid content to the receptacle relative to an uncoated sidewall.

19. The receptacle of claim 1, wherein the solid frozen liquid content includes at least one of a frozen liquid extract and a frozen liquid concentrate.

20. The receptacle of claim 19, wherein the solid frozen liquid content includes nutrients.

21. The receptacle of claim 1, wherein the empty space is sized sufficiently so that when the receptacle is placed in the dispensing apparatus, the closure is perforable by a second needle disposed within the dispensing apparatus and the solid frozen liquid content can be displaced into the empty space, when in the second position, by the needle that perforates the end layer.

22. The receptacle of claim 1, wherein the opening defined by the second end is a flanged opening.

23. The receptacle of claim 1, wherein the receptacle comprises aluminum.

24. The receptacle of claim 1, wherein the sidewall and the end layer are a continuous layer.

25. The receptacle of claim 1, wherein the empty space includes at least one of an inert gas and a reduced reactivity gas in place of atmospheric air.

26. The receptacle of claim 25, wherein the receptacle is filterless.

27. The receptacle of claim 26, wherein the receptacle comprises aluminum.

* * * * *